US006706667B1

(12) United States Patent
Smith et al.

(10) Patent No.: US 6,706,667 B1
(45) Date of Patent: Mar. 16, 2004

(54) SHALE-STABILIZING ADDITIVES

(76) Inventors: Carl Keith Smith, 59 Springbank Crescent, S.W., Calgary, Alberta (CA), T3H 3S6; Terence George Balson, 49 Glenavon Park, Bristol BS9 1RW (GB)

( * ) Notice: Subject to any disclaimer, the term of this patent is extended or adjusted under 35 U.S.C. 154(b) by 0 days.

(21) Appl. No.: 09/763,239

(22) PCT Filed: Aug. 9, 1999

(86) PCT No.: PCT/GB99/02623

§ 371 (c)(1),
(2), (4) Date: Jun. 1, 2001

(87) PCT Pub. No.: WO00/09625

PCT Pub. Date: Feb. 24, 2000

(30) Foreign Application Priority Data

Aug. 15, 1998 (GB) ............................................. 9817780

(51) Int. Cl.[7] .............................. C09K 7/02; C09K 7/00
(52) U.S. Cl. ....................... 507/118; 507/119; 507/125; 507/221; 507/224; 507/231
(58) Field of Search ................................ 507/118, 119, 507/125, 221, 224, 231; 175/64

(56) References Cited

U.S. PATENT DOCUMENTS

| 3,332,872 A | | 7/1967 | Oakes ........................ 252/8.5 |
| 3,880,765 A | * | 4/1975 | Watson ........................ 507/221 |
| 4,085,168 A | | 4/1978 | Milkovich et al. ........... 260/886 |
| 4,172,800 A | | 10/1979 | Walker ........................ 252/8.5 |
| 4,338,203 A | * | 7/1982 | Hunter ........................ 507/221 |
| 4,341,647 A | * | 7/1982 | Hunter ........................ 507/221 |
| 4,830,765 A | | 5/1989 | Perricone et al. ........... 252/8.51 |
| 5,597,783 A | | 1/1997 | Audibert et al. ............. 507/120 |
| 5,637,556 A | | 6/1997 | Argillier et al. ............. 507/120 |
| 5,739,212 A | | 4/1998 | Wutz et al. .................. 525/411 |
| 5,851,961 A | * | 12/1998 | Magyar ....................... 507/119 |

FOREIGN PATENT DOCUMENTS

| DE | 2312616 | 9/1974 | ............ C08F/27/12 |
| EP | 0306449 | 3/1989 | ............. C08F/8/14 |
| EP | 0495579 | 7/1992 | ............. C09K/7/02 |
| WO | 91/16522 | 10/1991 | ............ E21B/33/13 |
| WO | 96/24645 | 8/1996 | ............. C09K/7/02 |
| WO | 96/24646 | 8/1996 | ............. C09K/7/02 |

OTHER PUBLICATIONS

Helene Derand, Bengt Wesslen, Bengt Wittgren and Karl–Gustav Wahlund, Poly(ethylene glycol) Graft Copolymers Containing Carboxylic Acid Groups: Aggregation and Viscometric Properties in Aqueous Solution, *Macromolecules* Vol 29, pp. 8770–8775 (Dec. 30, 1996).

Andrew R. Eckert and S.E. Webber, Naphthalene–Tagged Copolymer Micelles Based on Polystyrene–alt–maleic anhydride–graft–poly(ethylene oxide) *Macromolecules*, Vo. 29, pp. 560–567 (Jan. 15, 1996).

* cited by examiner

*Primary Examiner*—Philip C. Tucker
(74) *Attorney, Agent, or Firm*—Howrey Simon Arnold & White LLP.

(57) ABSTRACT

A shale-stabilizing additive is described which comprises a copolymer of an olefinically unsaturated hydrocarbon and an ethylenically unsaturated carboxylic acid, carbocylic acid salt or carboxylic acid anhydride with alkylene oxide based side chains. The additive can be used for water-based service fluids (WBM) to facilitate the drilling or completion process in shales or clayey formations.

10 Claims, No Drawings

SHALE-STABILIZING ADDITIVES

This is a U.S. National Phase entry under 35 USC §371 of International Application No. PCT/GB99/02623, filed Aug. 9, 1999 (09.08.1999) designating the US which claims priority to British Patent Application No. 9817780.1 filed Aug. 15, 1998 (15.08.1998) the contents of both being herein incorporated by reference.

This invention concerns drilling or completion fluids, particularly water-based drilling or completion fluids. More specifically, it pertains to additives for such fluids. Even more specifically, the invention relates to additives used to prevent shales or clayey formations from adversely affecting well drilling or well completion operations.

BACKGROUND OF THE INVENTION

Drilling fluids are used in well drilling operations, e.g., during drilling of oil and gas wells. During drilling, drilling fluid is pumped down a drillstring, discharged through ports in the drill bit and returned to the surface via the annulus between the drillpipe and the surrounding formation. The drilling fluid performs a variety of functions including cooling and lubricatig the drill bit and drillstring, removing rock cuttings generated during the drilling process and carrying them to the surface, susperding cuttings in the annulus when pumping stops, preventing squeezing in or caving of the formation and keeping formation fluids at bay.

Drilling fluids generally comprise a carrier, a weighting agent and chemical additives. Drilling fluids fall into two main categories: water-based drilling fluids, also known as water based muds (WBMs), in which the carrier is an aqueous medium; and oil-based drilling fluids, also known as oil-based muds (OBMs), in which the carrier is oil or a water/oil emulsion. Oil based muds are technically superior to WBMs in certain important respects, including the comparative lack of adverse reactivity of OBMs with shales, one of the most commonly encountered rock types during drilling for oil and gas. The use of OBMs, however, has the disadvantage of resulting in production of large quantities of oil-contaminated waste products such as cuttings that are difficult to dispose of in an environmentally acceptable way. While the use of WBMs is environmentally more acceptable than of OBMs, the performance of WBMs, particularly when drilling through water sensitive rocks such as shales, is technically inferior to that of OBM. Shales exhibit great affinity for water, and adsorption of water by shales causes the shale to swell and produces chemical changes in the rock which produce stresses that weaken the formation, possibly leading to erosion of the borehole or loss of structure. This can lead to drilling problems such as wellbore erosion or stuck pipe. In addition, inferior wellbore quality may hinder logging and completion operations.

Much effort has been put into improving the performance of WBM relative to shales, namely improving the level of so called shale inhibition of WBM. Various chemical additives have been incorporated in WBM in attempts to improve shale inhibition. In particular water soluble glycols, polyhydric alcohols (i.e. chemicals containing more than one hydroxyl group) or polyglycols (i.e. chemicals made using alkylene oxides such as ethylene oxide or propylene oxide) are widely used for this purpose, typically being added to WBM in amounts in the range 3 to 10% by weight. These chemicals can be collectively referred to as Polyols. Polyols used in this way include, for example, glycerols, polyglycerols, glycols, polyalkylene glycols (PAG), e.g. polyethylene glycols (PEG), polypropylene glycols (PPG) and copolymers of ethylene and propylene glycols, alcohol ethoxylates (AET) and glycol ethers. A typical inhibitive AET is an n-butanol derivative of ethylene oxide. The PAGs can have a range of ethylene oxide:propylene oxide (EO:PO) ratios and can be random or block copolymers; a frequently used material of this type is understood to be a random copolymer with an EO:PO ratio of about 1:1.

Variants of polyalkylene glycols and alcohol alkoxylates are for example described in the International Patent Applications WO-96/24645 and WO-96/24646. Others are found in the European Patent Application EP-A-0495579, the U.S. Pat. Nos. 4,830,165 and 4,172,800.

A further source relating to the background of the invention is the Society of Petroleum Engineers Reports SPE 28960 (Mechanism of Shale Inhibition by Polyols in Water Based Drilling Fluids) proposing a credible mechanism that adequately describes how such polyols provide shale inhibition.

Copolymers of styrene and maleic anhydride and a number of derivatives are described for example in the U.S. Pat. No. 3,332,872, for use as viscosity control agents. Mydrophilic-hydrophobic graft copolymers with polystyrene side chains for drilling fluids appear in the U.S. Pat. No. 4,085,168. Other hydrophobically modified polymers based on polyacrylamide and hydroxyethylcellulose have been disclosed for example in the U.S. Pat. Nos. 5,597,783 and 5,637,556.

Shale swelling is considered as a problem not only in the oil field industry. It is encountered as clay swelling in the mining industry, where this phenomenon causes severe difficulties when dewatering the mineral tailings.

In view of the above, it is an object of the invention to provide a novel additive for inhibiting shale swelling. It is another, more specific object of the invention to provide an additive for a WBM.

SUMMARY OF THE INVENTION

The objects of the invention are achieved by shale-stabilizing additives as set forth in the appended independent claims. According to a first aspect of the invention, there is provided a shale-stabilizing additive comprising a polymer based on an olefinically unsaturated hydrocarbon with alkylene oxide based side chains.

Useful olefinically unsaturated hydrocarbons generally are aliphatic olefinically unsaturated hydrocarbons or vinylidene aromatic monomers.

Aliphatic olefinically unsaturated hydrocarbons include, for example, α-olefin monomers containing from 2 to 28, preferably from 4 to 20, more preferably from 8 to 18 carbon atoms.

Preferred olefinically unsaturated hydrocarbons are vinylidene aromatic monomers. Suitable vinylidene aromatic monomers include, for example, those represented by the following formula.

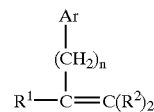

wherein $R^1$ is hydrogen or an alkyl group containing 1 to 4 carbon atoms, preferably hydrogen or methyl; each $R^2$ is independently hydrogen or an alkyl group containing 1 to 4 carbon atoms, preferably hydrogen or methyl; Ar is a phenyl group or a phenyl group substituted with 1 to 5 $C_1$–$C_4$-alkyl substituents; and n has a value from zero to 4, preferably from zero to 2, most preferably zero. Preferred monomers are styrene or styrene derivatives including α-methyl styrene, the $C_1$–$C_4$-alkyl- or phenyl-ring substituted derivatives of styrene. such as ortho-, meta-, and para-methylatyrene, para-vinyl toluene or mixtures thereof. The most preferred vinylidene aromatic monomer is styrene.

The polymer is preferably a copolymer of an above-described olefinically unsaturated hydrocarbon and an ethylenically unsaturated carboxylic acid, carboxylic acid salt or carboxylic acid arhydride with alkylene oxide based side chains. Preferred olefinically unsaturated carboxylic acids contain 2 to 12, more preferably 2 to 6, carbon atoms in addition to the carboxyl group(s). They are preferably mono-carboxylic acids or, more preferably, dicarboxylic acids. Preferred examples thereof are acrylic acid, methacrylic acid, fumaric acid, maleic acid, the salts thereof, or maleic anhydride. Most preferably, maleic acid, maleic anhydride and/or a maleic acid salt is incorporated in the polymer. The alkali metal salts, particularly the sodium salt, are the preferred carboxylic acid salts.

Alkylene oxide based side chains can be introduced into the polymer by esterification of carboxylic groups or anhydride groups with a polyoxyalkylated compound, such as a polyoxyalkylated alcohol. The esterification step can be carried out before or after the polymerization reaction of the dicarboxylic acid (salt) or the anhydride with the vinylidene aromatic monomer. The polymerization reaction and the esterification step are generally known in the art. Preferably 2 to 75 percent, more preferably 20 to 60 percent, most preferably about 50 percent of the total number of carboxyl carbon atoms in the polymer are esterified. In a preferred embodiment of the invention, the polymer is a copolymer of styrene or a styrene derivative and maleic anhydride with alkylene oxide based side chains.

The molecular weight of the additive is preferably from 5000 g/mol to 100,000 g/mol, more preferably from 10,000 g/mol to 30,000 g/mol. The preferred weight of the alkylene oxide based side chain in accordance with the invention is above 200 g/mol and below 1500 g/mol, more preferably 300–600 g/mol.

The number of alkoxylate groups, e.g. —$CH_2$—CHR—O— with R being M, $CH_2$ or $CH_2$—$CH_3$, per side chain is preferably up to 60 units.

A preferred molecule in accordance with the invention has the molecular structure:

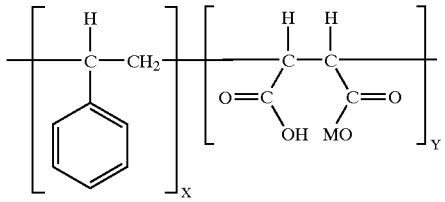

M in each occurrence independently is hydrogen or —[$CH_2$—CHR—O—]$_n$—$CH_3$ with R being $CH_3$ or $CH_2$—$CH_3$ or, preferably, hydrogen, with the proviso that at least some of the radicals M have the meaning of —[$CH_2$—CHR—O—]$_n$—$CH_3$. X and Y each independently are from 1 to 100. The total of X and Y should generally be greater than 4 and the invention works best if the total of X and Y is greater than 50. The ratio of X:Y is preferably from 1:3 to 3:1, more preferably about 1:1. The value of n is from 3 to 70, preferably greater than 4 and less than 60. More preferably, n is 7–25.

The above-described polymer is preferably used as an additive in water-based drilling fluids (WBM) or completion fluids or in dewatering operations for mineral tailings.

In another aspect, the invention concerns a drilling fluid with 0.1 to 10 weight per cent (wt %) of the polymer as characterized before. More preferably, the polymer are used at 2 to 7 wt %.

The additives in accordance with the invention provide higher levels of shale swelling inhibition in the presence of weakly hydrated cations, such as potassium, cesium, and ammonium. Inhibition can be obtained solely from using the additives in freshwater or preferably in combination with salts containing so for example sodium, calcium, magnesium, or potassium ions.

It can also be expected that the novel additives can improve current methods of dewatering mineral tailings in the mining industry, as today this process is severely hampered by clay swelling.

These and other features of the invention, preferred embodiments and variants thereof, and further advantages of the invention will become appreciated and understood by those skilled in the art from the detailed description following below.

EXAMPLE(S) FOR CARRYING OUT THE INVENTION

The preparation of the chemicals compounds used in the following examples as additives is known. Following the preparation steps laid out for example by H. Dérand et al. in Macromolecules 29 (1996), 8770–8775 and by A. Eckert and S. E. Weber in Macromolecules 29 (1996), 560–567, copolymers of styrene and maleic acid (SMACs) can be grafted with poly(ethylene glycol) (PEGs) or derivatives, thereof.

The shale inhibition capabilities of additives can be assessed by a number of laboratory techniques such as cuttings dispersion, cuttings hardness and shale swelling tests. These tests are suitable for rapid screening of new additives and are widely used in the industry.

Shale recovery from bottle rolling tests have been used to measure the shale inhibition properties. Tests were done using Oxford Clay cuttings (a water sensitive shale) sieved to 2–4 mm. Briefly, the test is a modification of a standard oilfield cuttings dispersion test and consists of adding 10 g of test substrate (Oxford Clay) with 100 ml of test fluid in a 300 ml bottle. Thie test samples are rolled at 50 rpm for 4 hours. This encourages breakdown and dispersion of the cuttings if they become soft due to interaction with the test fluid. The shale cuttings are sieved through a 250 micron screen and the amount of shale recovered is measured after drying in an oven. The poly(ethylene glycol) (PEG) used in these tests had a molecular weight of about 600 g/mol.

Bottle rolling tests were done with 5% w/v solutions of the invention in 7.6% (Table 1) and 12.9% w/w KCl (Table 2). The grafted copolymer used in both of these cases was the same. The backbone consisted of an alternating copolymer of styrene and maleic anhydride (SMAC) with grafted poly(ethylene glycol) monomethyl ethers (MPEG 500) side chains of about 500 g/mol. A significant increase in the amount of shale recovered was observed when the invention wan used over that of PEG/KCl. A comparison of the results of Table 1 and 2 shows that the amount of shale recovered by the invention increased with the amount of KCl.

TABLE 1

Shale recovery results from bottle rolling tests with Oxford clay cuttings for polyglycol and SMAC grafted copolymer in 7.6% w/w KCl.

| Sample | % Shale Recovery |
| --- | --- |
| 7.6% KCl | 20 |
| PEG | 39 |
| SMAC (MPEG 500) | 64 |

TABLE 2

Shale recovery results from bottle rolling tests with Oxford clay cuttings for PEG and SMAC copolymer with MPEG 500 grafts in 12.9% w/w KCl.

| Sample | % Shale Recovery |
| --- | --- |
| 12.9% KCl | 29 |
| PEG | 51 |
| SMAC (MPEG 500) | 91 |

The amount of shale recovery of the invention as a function of the grafted MPEG chain length is shown in Table 3. The results show that all MPEG variations of the invention show improved shale recovery compared to that of polyethylene oxide and that the best results are obtained for copolymers with MPEG grafts with molecular weight of about 300 to 400 g/mol.

TABLE 3

Shale recovery results from bottle rolling tests with Oxford clay cuttings for polyglycol and grafted copolymer in 7.6% w/w KCl where the molecular weight of graft polyethylene oxide varies from 200 to 1500 g/mol.

| Sample | % Shale Recovery |
| --- | --- |
| 7.6% KCl only | 25 |
| PEG | 38 |
| SMAC MPEG 200 | 54 |
| SMAC MPEG 300 | 87 |
| SMAC MPEG 400 | 85 |
| SMAC MPEG 500 | 72 |
| SMAC MPEG 600 | 69 |
| SMAC MPEG 750 | 70 |
| SMAC MPEG 1100 | 66 |
| SMAC MPEG 1500 | 49 |

Table 4 shows bottle rolling test results in 12.9% w/w KCl that include a polymer that consists of a backbone with 2 styrene units for every maleic anhydride unit. MPEG 500 was used as the grafting polymer. The results show that increasing the amount of styrene in the backbone increased the amount of shale recovered.

TABLE 4

Shale recovery results from bottle rolling tests with Oxford clay cuttings for polyglycol and grafted copolymer in 12.9% w/w KCl. The backbone of SMAC 2:1 Styrene MPEG 500 was composed of 2 styrene units for every maleic anhydride. The grafts consisted of MPEG 500.

| Sample | % Shale Recovery |
| --- | --- |
| 12.9% KCl | 27 |
| PEG | 53 |
| SMAC MPEG 500 | 85 |
| SMAC 2:1 Styrene MPEG 500 | 95 |

The effect of drilling fluid additives on reactive shales can also be assessed by the Hassler Cell test. Briefly, fluids are pumped through a confined Oxford Clay core perpendicular to the bedding planes at high pressure and the permeability of the core to the test fluid is measured and compared with that of a synthetic pore fluid. In general, greater shale inhibition can be achieved by reducing the permeability of the test fluid within the core. For instance, the permeability of oil based muds (OBM) is much lower than the pore fluid due, in part, to the change in wettability caused by OBM surfactants. Inhibitive water based drilling fluids also show significant reductions in fluid permeability. PEG/KCl based fluids show permeability reductions from 11 to 46% and silicate based systems show reductions of between 65–80%. The permeability reduction caused by the invention (SMAC MPEG 500) was about 96.9%. This is the greatest amount of reduction for a water based fluid observed to date and is equal to that of an oil based drilling fluid.

TABLE 5

Flow Rate Changes in Oxford Clay Cores by Various Fluids in Hassler Cell Tests.

| Fluid type | Flow Rate before [g/hr] | Flow Rate after [g/hr] | % Original Rate |
| --- | --- | --- | --- |
| 10% KCl | 0.043 | 0.061 | 142 |
| PEG/KCl | 0.037 | 0.033 | 89 |
| PEG-$C_6H_9$/KCl | 0.037 | 0.020 | 54 |
| KCl/Silicate | 0.052 | 0.010 | 19 |
| NaCl then KCl/Silicate | 0.068 | 0.024 | 35 |
| 70:30 OBM | 0.036 | 0.0024 | 6.6 |
| SMAC (MPEG 500)/KCl | 0.1397 | 0.0043 | 3.1 |

Improved shale inhibition is exhibited by many variations of the invention as is shown above. The improved shale inhibition is primarily the result of the hydrophobic portions of the molecule and inhibition increases with the amount of styrene in the backbone. The invention appears to provide shale inhibition by reducing the permeability of aqueous solutions in reactive shales.

The invention also shows improved results in bulk cuttings hardness test which is a modification of a standard industry analysis. In this experiment 30 g of sieved Oxford Clay cuttings (2–4 mm) were put in 200 mls of the test fluid for 2 hours. The test fluid is drained off and the cuttings are put into a press cell. The cuttings are then pressed through a plate with holes and the amount of torque required is reasured with every turn of the torque gauge. The plateau torque is quoted as the cuttings hardness. Table 6 shows the results of tests conducted on a series of test samples in 12.9% KCl. PEG and SMAC MPEG 500 samples contained 5% w/v test additive.

TABLE 6

Bulk Cuttings hardness in 12.9% KCl fluids.

| Sample | Cuttings Hardness [N * m] |
| --- | --- |
| 12.9% KCl | 1.6 |
| PEG | 8 |
| SMAC MPEG 500 | 12 |
| natural Oxford Clay (no fluid) | 14 |

The results in Table 6 show that the MPEG grafted copolymers results in harder cuttings than the polyethylene glycol/KCl mud.

The results of clay dispersion, Hassler Cell and cuttings hardness tests clearly show the improved levels of inhibition provided by fluids containing MPEG grafted SMAC copolymer in place of poly(alkylene oxides) in KCl based fluids.

The performance of the KCl/SMAC system was measured as a function of the KCl concentration. SMAC concentration and fluid conditions. The performance was found to increase with the concentration of KCl and SMAC up to a threshold value after which performance levelled. Tests conducted with Oxford clay found that the threshold concentration of KCl to be between 10 and 14% w/w. The threshold value for maximum performance of SMAC was between 1 and 2% w/v.

SMAC performance increased substantially if residual maleic anhydride groups present were hydrolysed to the acid form. SMAC with maleic acid groups are sensitive to the pH of the fluid. The optimum shale recovery was found to occur at pH of 9. Excellent performance was observed for SMAC fluids in the pH range of 7 to 11. Shale inhibition declined rapidly above pH of 11.5.

Replacement of the polyethylene glycol side chains with polypropylene glycol based side chains gave inferior results.

What is claimed is:

1. A method of stabilizing shale in a subterranean formation comprising the step of injecting an additive into the formation comprising a polymer based on an olefinically unsaturated hydrocarbon with alkylene oxide based side chains.

2. The method of claim 1, wherein the polymer is a copolymer of an olefinically unsaturated hydrocarbon and an ethylenically unsaturated carboxylic acid, carboxylic acid salt or carboxylic acid anhydride with alkylene oxide based side chains.

3. The method of claim 1, wherein the polymer is a copolymer of styrene derivative and maleic anhydride with alkylene oxide based side chains.

4. The method of claim 1, wherein the polymer has a molecular weight of from 5000 g/mol to 100,000 g/mol.

5. The method of claim 1, wherein the weight of the alkylene oxide based side chains is about 200 g/mol.

6. The method of claim 1, wherein the number of alkoxylates in the polymer side chain is up to 60 units.

7. The method of claim 1, wherein the polymer has the molecular structure:

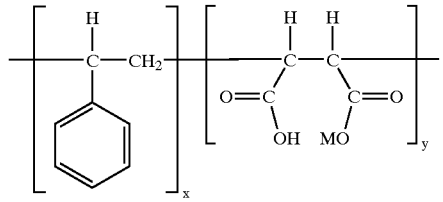

wherein M in each occurrence independently is hydrogen or $-[CH_2-CHR-O]_n-CH_3$ with R being $CH_3$ or $CH_2-CH_3$ or hydrogen, with the proviso that at least some of the radicals M have the meaning of $-[CH_2-CHR-O]_n-CH_3$, n is from 3 to 70, and x and y each independently are from 1 to 100.

8. The method of claim 3, wherein the residual maleic anhydride groups in the polymer are hydrolyzed.

9. The method of claim 1, wherein the additive is added to a wellbore drilling or service fluid.

10. The method of claim 9 wherein the wellbore fluid is water based.

* * * * *